Patented Dec. 19, 1922.

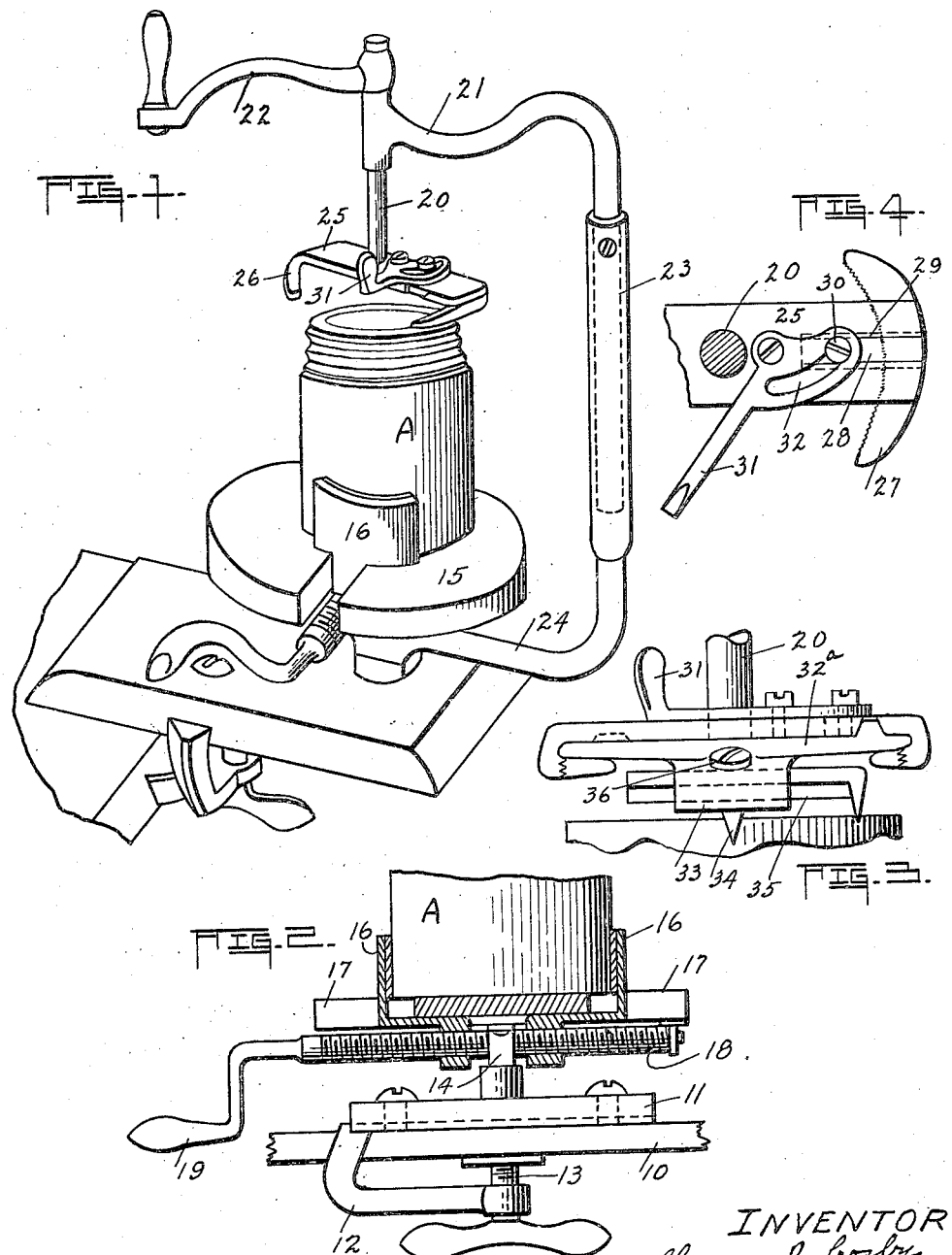

1,439,070

UNITED STATES PATENT OFFICE.

CLARENCE R. CROSBY, OF WILLIAMSFIELD, ILLINOIS.

MACHINE FOR SECURING SCREW CAPS TO CONTAINERS.

Application filed March 23, 1922. Serial No. 546,009.

*To all whom it may concern:*

Be it known that CLARENCE R. CROSBY, a citizen of the United States of America, residing at Williamsfield, in the county of Knox and State of Illinois, has invented certain new and useful Improvements in Machines for Securing Screw Caps to Containers, of which the following is a specification.

This invention relates to machines for securing screw caps to bottles, jars and the like; for cap incision for the purpose of opening such cap receptacles and to means for holding receptacles while being acted upon by the capping or opening devices.

The distinguishing novelty features of the invention include a support; manually operable adjustable members related to the support in a manner to engage a receptacle resting thereon; rotatable means for carrying operating tools serviceable optionally for either securing a cap on a receptacle or cutting incisions in the cap; a support for the rotatable member; means for relating the rotatable member to its support to permit the former to be turned into or out of engagement position with reference to a receptacle carried upon the support.

My invention also includes details with reference to an operating head associated with the rotatable member; to a certain adjustable characteristic therefor and to a cutting tool and the relationing of the same with the said head and to details of construction generally hereinafter more fully described.

In the drawings, Figure 1, is a perspective view of my complete device in association with a supporting stand or table and illustrating the manner of positioning and securing a receptacle in readiness to be operated upon by the incisioning device.

Figure 2, is a vertical sectional view of the base portion of my device showing details of operating mechanism and the manner of supporting the complete device in connection with a general support.

Figure 3, is a detailed view of a head member connected with a rotatable shaft and the association therewith of a cutting tool and, Figure 4, is a detailed view showing the manner of relating an adjustable member to the head member and means for moving the former longitudinally of the head member.

Referring to the drawings, 10 indicates a general support to which the complete device may be attached. 11 is a framing member which operates in connection with arm member 12 and active screw member 13 and its associated parts to clamp the framing member 11 firmly to the general support 10.

14 is a vertically disposed supporting member fixed to framing member 11 and to the supporting base 15. 16 are arcuate shaped clamping members fashioned for seating upon support 15 and related to channel ways 17 in said support in a manner to be reciprocal radially thereof and co-acting in connection with screw member 18 and particularly with opposed sectional threading thereof, whereby, when the screw is turned, by means of the crank arm 19, connected therewith, the clamping members will be moved optionally towards or from the center of the support 15 according to the direction of turning of said screw.

Receptacles as A are designed to be placed upon support 15 and to be held securely thereon by clamping members 16 while being operated upon either to effect cap closure or for cutting the cap to effect opening.

The operating means for effecting cap closure of a receptacle or for cutting the same for opening includes the rotatable shaft 20 supported in a bracket member 21 and turnable through movement of crank member 22 secured to the upper end thereof. Bracket 21 is supported in the standard comprising the tubular vertically disposed section 23 within which a vertically disposed arm of bracket 21 is carried and related in a manner whereby said bracket may be turned freely. Standard 23 in turn is supported upon bracket member 24 which is permanently fixed to the supporting member 14.

25 is a head member fixed to rotatable shaft 20 and is fashioned at one end with an integral hooked and arcuate shaped member 26, the main portion thereof being spaced slightly below the bottom portion of the head, whereby engagement may be had through said arcuate shaped member with a cap designed to be applied to a container. The opposite end of the head member is provided with a similar hooked arcuate shaped clamping member but is designed for adjustable relation to the head. Said adjustable member comprising the arcuate shaped portion 27 provided with a tongue portion 28 lying in a grooved portion 29 in said head. The clamping member 27 and its connected tongue member are held in the slot by means of a headed screw member 20 connected therewith engaging the upper wall of lever 31 and being embraced within the arcuate slot 32 in said lever. The adjustable clamping member 27 of the head is actuated by a simple movement of arcuate lever 31 in the proper direction to cause the member to be moved in the direction desired.

In a certain use of my device the head member and its associated clamping members may serve as a holding means for a cutting tool of any suitable character. However, I have shown a preferred form of cutting tool herein which comprises a plate portion 32ª relatively fashioned in conjunction with the head member and its clamping members to be secured in conjunction with said head. To this base member a longitudinally perforated lug 33 is integrally united and to the lower portion of said lug and in line with the center of rotatable shaft 20 a perforating spike 34 is provided to fix the head and cutting tool in proper position with reference to the receptacle to be opened by penetrating the head thereof. 35 is a cutting tool adjustably fixed in the perforated lug 33 by means of a set screw 36.

From the above description the operation of the device for the purposes of capping containers or for cutting the caps thereon, is so obviously apparent that it is deemed unnecessary to specify further with respect to such operation.

I have shown herein my preferred form of embodiment of my invention. However, form and arrangement of parts may be varied and a perfectly operable and usable device be provided and therefore, I do not desire to be limited to form or details as herein disclosed but claim all forms and detailed constructions that embody the principles of disclosure herein made.

What I claim is:

1. In a container capping device, in combination, a base member, adjustable clamping members associated therewith, means for actuating the clamping members towards or from the center of said base member, a rotatable member vertically disposed and capable of axial alinement with the center of said base member, a head member and associated relatively adjustable clamping members, means for effecting adjustment of said clamping members, means for turning the rotatable member, and means for supporting the rotatable member to facilitate lateral movement thereof with reference to the axial alinement through the center of the support.

2. In a container capping device, in combination, a base member, adjustable clamping members cooperating therewith for holding a container, a rotatable member vertically disposed with reference to the base member and located at a spaced distance from the latter, a bracket arm for supporting said rotatable member, a fixed support for said bracket arm connected with the latter to facilitate the bracket being moved at option both vertically and laterally, a head member fixed to the rotatable member comprising members relatively adjustable and fashioned to provide clamping jaws for engaging a container cap, and means for turning the rotatable member.

3. In a container capping device, in combination, means for supporting and holding a container in fixed position, means for carrying and applying a cap for closing said container, comprising a rotatable stem or shaft, means for supporting the shaft in vertical position and for permitting its being adjusted vertically or laterally, a head member in the lower extremity of said shaft comprising jaw members relatively adjustable for engaging a cap member, means for fixing the jaw members in locked relation upon the cap member, and means for turning the rotatable shaft.

In testimony whereof I affix my signature.

CLARENCE R. CROSBY.